(12) United States Patent
Darianian et al.

(10) Patent No.: US 7,872,581 B2
(45) Date of Patent: Jan. 18, 2011

(54) METHOD, DEVICES AND SYSTEM FOR MULTIPLE RFID TAG READ-OUT

(75) Inventors: Mohsen Darianian, Lohmar (DE); Santtu Teemu Olavi Naukkarinen, Espoo (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 11/864,135

(22) Filed: Sep. 28, 2007

(65) Prior Publication Data
US 2009/0085738 A1    Apr. 2, 2009

(51) Int. Cl.
*G08B 13/14* (2006.01)
(52) U.S. Cl. ............... 340/572.1; 340/572.4; 340/5.92; 340/10.3; 340/10.34
(58) Field of Classification Search ............. 340/572.1, 340/572.4, 572.8, 10.3, 10.34, 10.4, 10.5, 340/5.92; 235/435, 492
See application file for complete search history.

(56) References Cited

U.S. PATENT DOCUMENTS

| | | | |
|---|---|---|---|
| 5,686,902 A | | 11/1997 | Reis et al. |
| 7,408,463 B2 * | | 8/2008 | Hammond et al. ....... 340/572.1 |
| 7,468,650 B2 * | | 12/2008 | Childress et al. .......... 340/5.92 |
| 7,606,530 B1 * | | 10/2009 | Anderson et al. .............. 455/7 |
| 2006/0145815 A1 | | 7/2006 | Lanzieri et al. |
| 2007/0008150 A1 | | 1/2007 | Hassell |
| 2007/0080804 A1 * | | 4/2007 | Hirahara et al. .......... 340/572.1 |
| 2008/0252426 A1 * | | 10/2008 | Lee et al. ................... 340/10.3 |

FOREIGN PATENT DOCUMENTS

| | | |
|---|---|---|
| EP | 1 146 455 A2 | 10/2001 |
| GB | 2 312 801 A | 11/1997 |

OTHER PUBLICATIONS

International Search Report and Written Opinion for PCT/EP2008/006963 mailed Dec. 4, 2008.

* cited by examiner

*Primary Examiner*—Davetta W Goins
(74) *Attorney, Agent, or Firm*—Alston & Bird LLP

(57) ABSTRACT

A method is provided, comprising transmitting a first radio frequency identification tag wake-up sequence by a master reader device; responsive to said first wake-up sequence, transmitting a second radio frequency identification tag wake-up sequence by at least one slave reader device; responsive to receiving said first and/or said second wake-up sequence at one or more radio frequency identification tags of a plurality of radio frequency identification tags, responding to said wake-up sequence; receiving responses from said one or more radio frequency identification tags at said master reader; deriving first tag information from said responses; and providing said first tag information. A corresponding system, master reader device and slave reader device are also provide.

22 Claims, 3 Drawing Sheets

METHOD, DEVICES AND SYSTEM FOR MULTIPLE RFID TAG READ-OUT

The invention relates to a method and devices for improved read-out of multiple radio frequency identification (RFID) tags.

Today's RFID systems are based on a flat architecture of an (active) reader and a single or multiple (passive) tags. One the most challenging issues in case of multiple tags is the reading accuracy. In conventional systems it can happen easily that tags are missed during a reading process, i.e. their information is not read out. The accuracy of conventional fixed readers in reading out multiple (probably even moving) tags is in the range of about 60-70%. Such low values can not be tolerated, especially in applications like inventory management of stores. Instead values close to 100% are required.

To compensate for this problem complex smoothing filters are employed using sliding windows to aggregate the lost readings. The size of the window per tag has to be selected carefully as a trade-off between accuracy and speed of reader response time, in view of the respective application. This increases the power consumption, which can be particularly critical in mobile reader devices.

Another problem is multiple tag collision management. This is solved in the Electronic Product Code (EPC) protocol by the use of special selection algorithms like tree-algorithm, memoryless, contactless or I-code protocol. Using such schemes means an additional increase in power consumption.

In applications using a fixed reader and moving tags the problem can be solved by reducing the speed of tags passing the reader. In case of mobile readers Near-Field Communication (NFC) readers exhibit acceptable power consumption. However, a limitation relies in the required small distance to the reader and the reduced speed in reading multiple tags, i.e. they have to be read in one by one. In Ultra High Frequency (UHF) technology the power consumption and accuracy of mobile readers is still sub-optimal and under research. Due to the costs of fixed readers it is not possible to simply increase the number of the readers in order to improve/decrease the number of tags to read per reader.

SUMMARY OF THE INVENTION

According to a first aspect of the invention a method is provided, comprising
  transmitting a first radio frequency identification tag wake-up sequence by a master reader device;
  responsive to said first wake-up sequence, transmitting a second radio frequency identification tag wake-up sequence by at least one slave reader device;
  responsive to receiving said first and/or said second wake-up sequence at one or more radio frequency identification tags of a plurality of radio frequency identification tags, responding to said wake-up sequence;
  receiving responses from said one or more radio frequency identification tags at said master reader;
  deriving first tag information from said responses; and
  providing said first tag information.

The invention suggests an improved read-out method for a hierarchical RFID reader architecture of the invention, which improves the detection accuracy of RFID tags. The hierarchical structure is a master-slave architecture comprising at least one master reader and at least one slave reader, together with a plurality of RFID tags. It may be the case that the master reader can not wake-up all RFID tags with the first wake-up sequence. This is compensated by the second wake-up sequence transmitted by the slave reader. The slave reader is arranged such that it can be activated by the first wake-up sequence, and that it can wake-up all RFID tags. Therefore, if some tags will not be activated by the first wake-up sequence, the second wake-up sequence will wake them.

This is achieved by the slave reader, which is located such that it has the best probability of waking up all the tags. The master reader receives the tags responses, irrespective if they have been wakened by the first or second wake-up sequence, and can correspondingly derive the tag information related to each tag.

According to an exemplary embodiment the method further comprises
  receiving responses from said plurality of radio frequency identification tags at said slave reader;
  deriving second tag information from said responses; and
  storing said second tag information; and
  providing said stored second tag information.

This embodiment enables the slave reader to act as a kind of "relay" for tag information. It stores the tag information and is able to provide it for further use.

According to an exemplary embodiment the method further comprises
  responsive to completion of receiving said responses and storing said second tag information, communicating an acknowledgement indicating said completion from said at least one slave reader device to said master reader device.

As but one example this could e.g. be implemented with a procedure similar to a multiple tag anti-collision algorithm such as the I-code protocol. In that case, a reader may provide time frames with N slots. Each tag may generate a random number to answer one by one. The tag detection ends when none of the tags sends data anymore. Other mechanisms, algorithms or protocols are equally conceivable.

According to an exemplary embodiment said stored second tag information is provided to said master reader device, the method further comprising
  providing said second tag information by said master reader.

In an alternative exemplary embodiment said stored second tag information is provided to a mobile reader device, by said master reader device or said at least one slave reader device.

According to an exemplary embodiment the method further comprises
  requesting second tag information from said at least one slave reader device by said master reader device;
  receiving second tag information from said at least one slave reader device; and
  providing said second tag information.

The slave reader can act as a relay for the master reader, i.e. it can provide tag information that may not have been received by the master reader as one or more tags are out of range of the master reader. There are basically two modes of operation. In a first mode the master reader receives the responses and thus derives the tag information from tags in his range, i.e. that wake up from the first wake-up sequence, and then additionally is provided with the second tag information from the slave reader, such that in total the master reader has the tag information of all RFID tags.

It is to be noted that in this mode the slave reader may provide at least some tag information already derived by the master reader, i.e. that the master reader has received itself. In this case the redundant information can be dropped (due to the optimized position of the slave reader usually the overlapping part of the master reader's information should be dropped, i.e. favoring the second tag information), or also be used to perform a basic "error detection", if the overlapping information is not identical. In case the overlapping information is not identical, the read-out process can be repeated.

In a second mode the master reader may disregard any direct responses from the RFID tags and only rely on the (second) tag information provided by the slave reader. As the slave reader is arranged to maximize its reading accuracy, this can provide for improved read-out results. Also it may allow to only power the master reader's wake-up sequence and not power up its actual reading circuit, until the slave reader's gathered information is read. This may provide for a power saving effect in the master reader.

In the alternative embodiment the slave reader can be used to provide the tag information to some mobile reader.

In many identification applications mobile readers are used for identification of tagged items. Conventional mobile readers have to wake up the tags and communicate with them. This is a very power consuming procedure especially in case of multiple tags. This invention proposes to use the above mentioned master-slave architecture for the wake up procedure as well as a proxy server for information exchange between the mobile reader and the tag of interest. In addition the mobile reader can benefit from the master-slave fault-tolerant architecture for read accuracy improvement and abstinence of power extensive wake-up and tag collision resolving.

According to an exemplary embodiment the method further comprises setting said plurality of radio frequency identification tags into a silent mode.

In some environments if may be necessary or desirable to put the RFID tags into silent mode and only trigger them again when needed.

According to an exemplary embodiment at least two slave reader devices provide their respective stored second tag information to said master reader device, the method further comprising determining the position of at least one radio frequency identification tag from said plurality of radio frequency identification tags, based on tag information related to said at least one tag provided by said at least two slave reader devices.

In an alternative exemplary embodiment at least three slave reader devices provide their respective stored second tag information to said master reader device, wherein the tag information provided by each of said at least three slave reader devices includes a received signal strength indication related to said at least one tag, and wherein the position of said at least one tag is determined based on said strength indication.

This enables localizing of RFID tags. In the first alternative, when it is assumed that the ranges of the slave reader devices define "zones" or "cells", the location can be performed by determining in which cells the respective tag is located. When the zones are overlapping this reduces the accuracy. If the zones are disjoint this localizing can be rather exact. The "main cell" defined by the master reader's range could also be taken into account here. If, as suggested in the second alternative, received strength indicators can be gathered by the slave readers, a more exact location can be performed by known methods as triangulation.

According to a second aspect a computer readable medium is provided, for storing instructions for instructing a controller to perform the method explained above.

According to a third aspect a master reader device is provided, comprising
a radio interface;
a network interface;
a controller; and
a power source;

wherein said controller is configured to transmit a first radio frequency identification tag wake-up sequence, to receive responses from one or more radio frequency identification tags of a plurality of radio frequency identification tags, to derive first tag information from received responses, to request and receive second tag information from a slave reader device related to one or more radio frequency identification tags of said plurality of radio frequency identification tags, and to provide said first and said second tag information via said network interface.

The master reader is a fixed reader provided with its own power. It also has wired or wireless connection to an enterprises' back-end system. It carries out the reader services requested from the enterprise system. It initiates a read process and wakes up the RFID tags and any slave reader in range. In addition it collects the item level information provided by the RFID tags and forwards it to the back-end for further processing. The master reader can communicate with other master readers in the enterprise.

According to an exemplary embodiment said controller is further configured to provide said first and said second tag information to a reader device, via said radio interface.

Any type of mobile reader device that enters in its range can be connected directly to the master reader. The master reader can work as a proxy entity between the mobile reader and local or remote server systems connected via the network interface, for information service provision.

According to an exemplary embodiment said master reader controller is configured for transmitting an instruction for setting radio frequency identification tags into a silent mode, using said radio interface.

According to a fourth aspect a slave reader device is provided, comprising
a radio interface; and
a controller;

wherein said controller is configured to transmit, responsive to a first radio frequency identification tag wake-up sequence, a second radio frequency identification tag wake-up sequence, using said radio interface.

The slave reader device can act as a kind of somehow "passive" relay, i.e. it acts as relay capturing transmission power from an active reader like the master reader and redirects it to any other tag which may not have been waken up by the master reader already.

According to an exemplary embodiment the device further comprises
a memory;

wherein said controller is configured to receive responses from radio frequency identification tags through said radio interface, to derive tag information from said responses, to store said tag information in said memory, and to provide said stored tag information.

In this embodiment the slave reader acts as an "active" relay, also gathering tag information, in order to relay it for further processing.

According to an exemplary embodiment said controller is configured for communicating, responsive to completion of receiving said responses and storing said tag information, an acknowledgement indicating said completion via said radio interface.

According to an exemplary embodiment said controller is configured for providing said stored tag information responsive to a request from a reader device.

According to an exemplary embodiment said controller is configured for forwarding an instruction for setting radio frequency identification tags into a silent mode, using said radio interface.

According to a fifth aspect a system is provided, comprising
- at least one master reader device having a first coverage area and having
  - a radio interface;
  - a network interface;
  - a controller; and
  - a power source;
- at least one slave reader device arranged within the first coverage area and having a second coverage area and having
  - a radio interface; and
  - a controller;
- at least a first plurality of radio frequency identification tags arranged within said second coverage area;

wherein
- said master reader controller is configured to transmit a first radio frequency identification tag wake-up sequence and to receive responses from said at least first plurality of radio frequency identification tags, to derive tag information from received responses, and to provide tag information via said network interface; and
- said slave reader controller is configured to transmit, responsive to said first radio frequency identification tag wake-up sequence, a second radio frequency identification tag wake-up sequence, using said radio interface.

This invention introduces a cost efficient hierarchical RFID reader architecture, which optimizes the accuracy of RFID read-out and can also help to reduce the power consumption of mobile readers. In this concept the responsibility of the reader is distributed between at least one master reader and one or more slave readers in a master-slave architecture.

According to an exemplary embodiment at least part of said second coverage area is located outside said first coverage area.

In this case, the slave reader acts as a relay for the master reader, at least for waking up tags.

According to an exemplary embodiment said slave reader controller is further configured to provide said first and said second tag information to a reader device, via said radio interface.

According to an exemplary embodiment said at least one slave reader device further comprises
  a memory;

wherein said slave reader controller is configured to receive responses from said at least first plurality of radio frequency identification tags through said radio interface, to derive tag information from said responses, to store said tag information in said memory, and to provide said tag information responsive to a request from a reader device.

According to an exemplary embodiment said slave reader controller is configured to provide said stored tag information responsive to a request from said at least one master reader device.

According to an exemplary embodiment said slave reader controller is configured for communicating, responsive to completion of receiving said responses and storing said tag information, an acknowledgement indicating said completion via said radio interface to said at least one master reader device.

According to an exemplary embodiment said slave reader controller is configured for forwarding an instruction for setting said at least first plurality of radio frequency identification tags into a silent mode, using said radio interface.

According to an exemplary embodiment said master reader controller is configured for transmitting an instruction for setting said at least first plurality of radio frequency identification tags into a silent mode, using said radio interface.

According to an exemplary embodiment the system comprises at least two slave reader devices, wherein said master reader controller is further configured for determining the position of at least one radio frequency identification tag from said at least first plurality of radio frequency identification tags, based on tag information related to said at least one tag provided by said at least two slave reader devices.

According to an exemplary embodiment the system comprises at least three slave reader devices, wherein the tag information provided by each of said at least three slave reader devices includes a received signal strength indication related to said at least one tag, and wherein the master reader controller is configured for determining the position of said at least one tag based on said strength indication.

According to an exemplary embodiment the system further comprises a mobile reader device located within the coverage range of at least one of said slave and master reader devices, wherein said mobile reader device is configured to communicate with said at least one of said slave and master reader devices.

According to an exemplary embodiment said mobile reader device is configured to enter a listening mode upon detecting a radio frequency field from said slave or master reader devices.

According to an exemplary embodiment said slave reader devices are configured to transmit or relay tag information to said mobile reader device.

According to an exemplary embodiment said mobile reader devices are configured to request tag information from said slave or master reader devices, and are further configured to receive said requested tag information in response.

According to another aspect of the invention a mobile reader device is provided, comprising
  a radio interface; and
  a controller;

wherein said controller is configured to exchange information with the master or slave readers and put said radio interface into a passive listening mode.

When a mobile reader enters the enterprise section, the master or slave readers identify its identification tag and wake up the tags in their radio range for further service provision. So the mobile reader will face alive and responding RFID tags and can read the available information from them or ask for any further services from the master or slave readers. In this context the mobile reader radio identification tag is just used for identification of the mobile reader in radio range of a master or slave reader. The "passive" read in the listening mode is performed via the RF interface. Nevertheless it is also possible to integrate the functionality of a full-powered mobile reader/writer and tag in one.

According to an exemplary embodiment the mobile reader further comprises a radio frequency identification tag. The mobile reader's identification tag is used for recognition of a new mobile reader in the radio range of the master or slave reader.

According to an exemplary embodiment the mobile reader is further configured to request tag information from a reader device located within communication range of said radio interface, and to receive said requested tag information from said reader device in response.

According to an exemplary embodiment the mobile reader further comprises a user interface configured for user data input.

According to an exemplary embodiment the mobile reader further comprises a user output configured for outputting received tag information to a user.

BRIEF DESCRIPTION OF THE DRAWINGS

The invention can be more fully understood by the following detailed description of exemplary embodiments, when also referring to the drawings, which are provided in an exemplary manner only and are not intended to limit the invention to any particular embodiment illustrated therein. In the drawings

DETAILED DESCRIPTION

Figure 1:
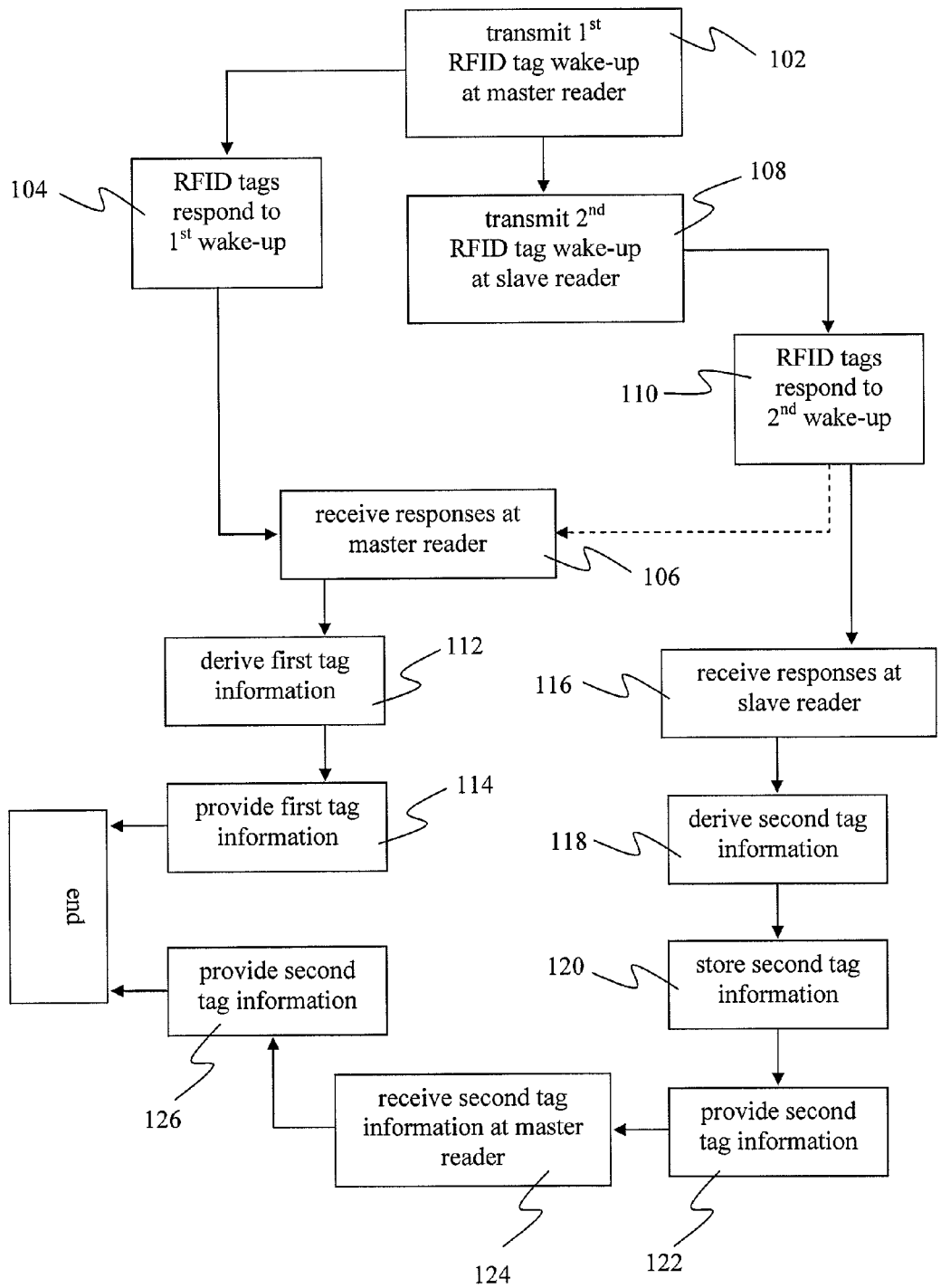
FIG. 1 shows a flow diagram of an embodiment of the method of the invention.

FIG. 1 shows a flow diagram of a method according to the invention, to be performed by a system according to the invention which will be explained later. The system comprises at least one master reader device, at least one slave reader device and a plurality of RFID tags. Before the depicted work flow starts, the system is initialized (not shown), e.g. a back-end server of an enterprise triggers the initialization. The master reader transmits a $1^{st}$ RFID tag wake-up sequence in step 102. Responsive to this, in step 104 RFID tags respond to this first wake-up sequence. It is to be noted that it is possible that not all RFID tags from the plurality of tags will already wake up responsive to the $1^{st}$ wake-up sequence. The responses of the already awaken tags are received at the master reader in step 106.

Responsive to the $1^{st}$ wake-up sequence the slave reader transmits a $2^{nd}$ wake-up sequence, in step 108. In one example embodiment the slave reader is a "passive" reader, i.e. does not have its own power supply. In this case the slave reader will be activated/provided with power from the $1^{st}$ wake-up sequence, similar to conventional passive RFID tags. It will then act as a kind of repeater and relay the RF energy to transmit the $2^{nd}$ wake-up sequence and wake up RFID tags in its range.

The slave reader can, however, also have some kind of power source in alternative embodiments. This includes a power socket, probably in combination with a suitable power supply, and also a battery. In this case the slave reader is not provided with power by the $1^{st}$ wake-up sequence but is still activated by it. Using its power source the slave reader will generate the $2^{nd}$ wake-up sequence.

Responsive to the $2^{nd}$ wake-up sequence RFID tags will respond in step 110. Any tag that was not waken up by the master reader's $1^{st}$ wake-up sequence should now be awake and provide its response, which is received at the master reader in step 106. It is to be noted that the tags that are waken up by the at least one slave reader must not necessarily make up all of the plurality of tags. In case there is more than one slave reader, usually each slave reader will have an associated group of RFID tags in its range. The ranges of different slave readers may overlap. All these groups together make up the plurality of RFID tags.

In step 112 the master reader will derive first tag information from the received responses. It should be noted that "first" in this context does not refer to tag information related to the responses to the $1^{st}$ wake-up sequence only, but does also include any responses that were triggered by the second wake-up sequence. In step 114 the derived first tag information is provided, e.g. to a enterprise back-end server, or also to any other reader device requesting the tag information, like mobile readers of customers or employees.

It is possible that the slave reader just acts as a kind of relay for RF energy, to wake up tags in its range. In alternative embodiments the slave reader also receives tag responses (in step 116) in order to gather tag information actively. Optionally the slave reader can send an acknowledgement to the master reader indicating the completion of the tag response gathering (not shown).

In this case, in step 118 the slave reader derives second tag information from received responses, stores the tag information in step 120, and then provides the stored tag information in step 122. The second tag information can be received at the master reader in step 124, e.g. responsive to a request (not shown) from the master reader. However, it is also possible that the second tag information is provided to any other reader device, e.g. mobile reader devices of customers and/or employees (not shown). In step 126 the master reader provides the second tag information, e.g. to the back-end server of an enterprise or a mobile reader.

In some environments it may be needed to put the RFID tags into silent mode and trigger them again only when needed. This can be performed following steps 106 and/or 116.

With respect to the situation when a mobile reader, e.g. of a customer or employee, enters the respective enterprise section, at least three cases can be identified. In one case the mobile reader is an active one. In this case it actively sends wake up signals. The mobile reader will recognize the available reader devices, both active and passive, and changes into the receive mode and stops sending wake up signals and communicates just with those readers.

In a second case the client application on the mobile reader device controls the mobile reader mode between passive or active mode in order to save power. The mobile reader receives the wake up signal, i.e. the $1^{st}$ or $2^{nd}$ wake-up sequence, in receive mode and sends back any application specific request to the enterprise's master reader(s) or slave reader(s).

In a third case the mobile reader is provided with its own mobile RFID tag which receives the wake up signal from a master or slave reader and then pops up the corresponding client application or activates the mobile reader.

Figure 2:
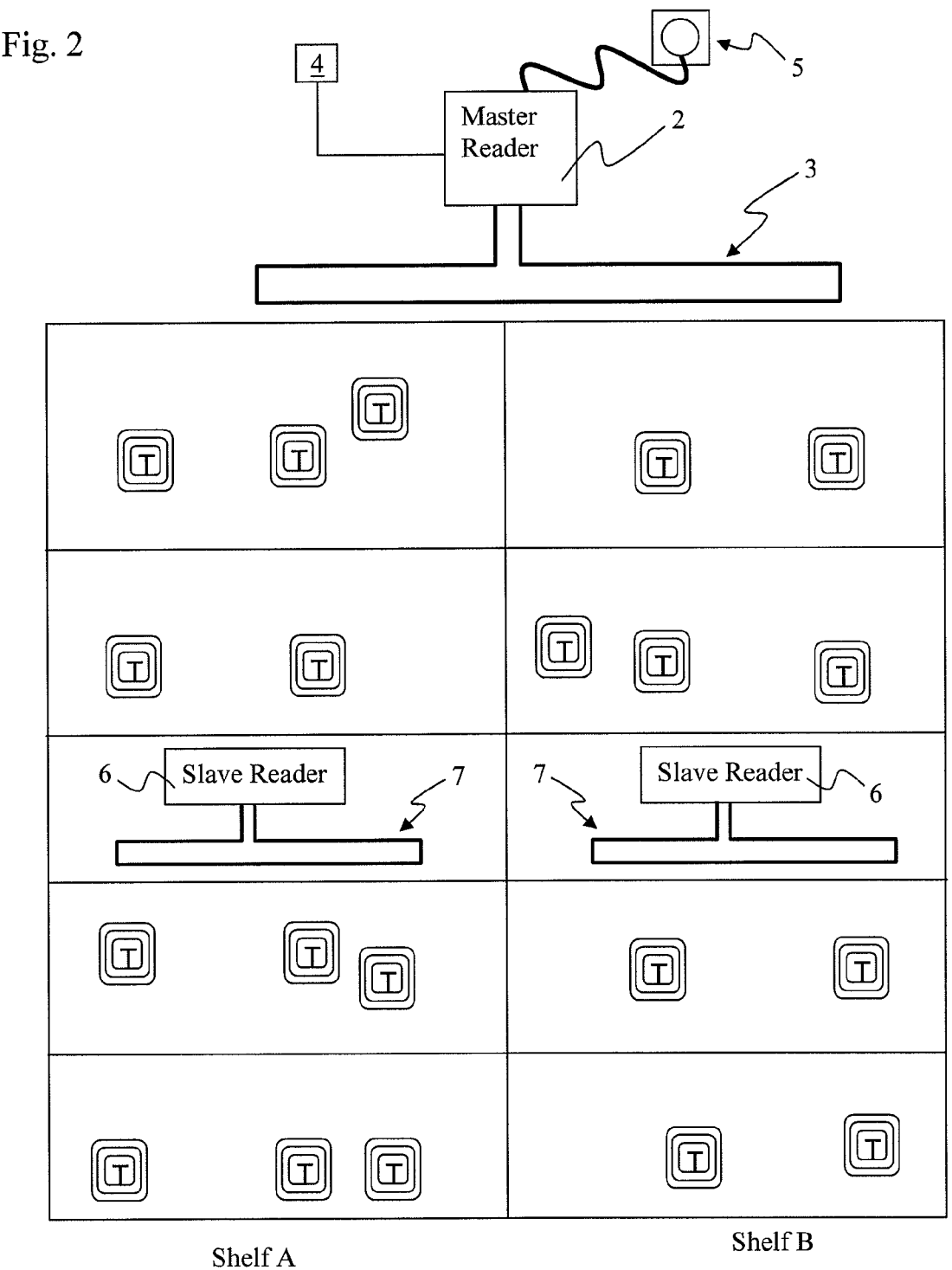
FIG. 2 is a schematic illustration of components of a system of the invention.

An RFID reader architecture or system is illustrated for a retail use case in FIG. 2. Each retail enterprise section (for example two shelves A and B in a store) is equipped with a master reader 2 with a network connection 4 to the enterprise's back-end system, and an RFID radio interface 3. The master reader 2 also comprises a power source 5 (here illustrated as a wall plug) and is controlled by a central controller. It carries out the reader services requested from the enterprise system.

The master reader 2 is able to power up slave reader devices 6 through their respective radio interfaces 7. Also it can power up some of the passive tags T in its range (in this figure e.g. tags in the first two rows from above).

It is not mandatory that the master reader 2 covers all tags T in any corner of the tag space. Each shelf A, B is equipped with a slave reader device 6 having an RFID interface 7. The slave reader devices are arranged so that they can transport the radiation signals from the master reader to those tags which are probably not reached by master reader itself (e.g. tags in the two lower rows of the shelves). In this case the slave reader devices act as a relay point.

In an embodiment, during the read process the slave reader devices take care about the responses of the tags in their coverage area. For better accuracy the slave reader devices can be arranged such that they overlap in reading range. For a fault-tolerant system they may overlap up to 50% on each side of the read space. The combination shown here with one master reader and two overlapping slave reader devices can provide for a fault-tolerant system.

In addition the readers with overlapping range can be used for localization of RFID tags, similar to cellular networks, wherein the location of a mobile phone can be acquired quite precisely at least in city areas, based on the cell a mobile phone is active in. In a department store, items could be located not only based on its response captured by a single reader, but based on many overlapping readers that "see" the same tag. This could be improved further if the readers are adapted to make use of received signal strength information. In such cases where the received signal strength can be determined, e.g. triangulation or other known localization schemes can be used to derive the location of a single tag.

This can be developed even further; also a mobile reader could provide location information based on e.g. a WLAN network. So the mobile reader would provide location information along with tag information (e.g. the tag ID). In a department store this could be a great help since items tend to travel with customers. The personnel using a mobile reader would immediately know if a particular item is in the correct department (the screen could be green or red if the location of an item is correct or wrong).

Conventional mobile readers are supposed to have the whole responsibility of waking up passive tags, initiating any reading/writing process, handle tag or reader collision management and communication with local or remote servers. All these are very power consumption intensive processes. Depending on the human movement or reading distance the bigger reading window sizes are needed to achieve an acceptable reading accuracy, which means longer active operation time for the mobile device reader.

When a mobile reader enters the enterprise section, it can read the available information from the RFID tags in the section and select or ask for any further services from the slave readers. Thus, the mobile reader's radio energy transmission part is not needed at all. The mobile reader is not providing the RF power for e.g. waking up tags, but only acts as a passive reader. One of the slave readers may wake up all tags upon detection of a mobile reader in the proximity.

In the architecture suggested by exemplary embodiments of the invention, a mobile reader faces always alive and responding tags or slave or master reader devices. So the mobile reader can act as a passive reader and does not need to initiate any power consuming wake-up procedure. The mobile reader's client application needs just to pop up and run for consuming the available information about the tags. The mobile reader is simply activated to send or request if it is needed.

There are other possibilities in yet another embodiment of a mobile reader to achieve more power efficiency in a mobile reader device. For example, an extended read/write RFID tag could take the role of the mobile reader and communicate with the enterprise reader system. In this case, the reader can be switched off completely.

Some mobile reader devices have their own built-in RFID tag for identification of the mobile reader at other reader devices. The mobile device's identification tag wakes up whenever the mobile reader enters the range space of a slave reader or master reader of the invention. The tag then alarms the corresponding mobile client application. The application triggers the mobile reader for a read process. In this way, a listen mode may be implemented as an optional feature in a mobile reader, which will allow for saving even more power in a mobile reader device that may be in a stand-by mode.

Figure 3:
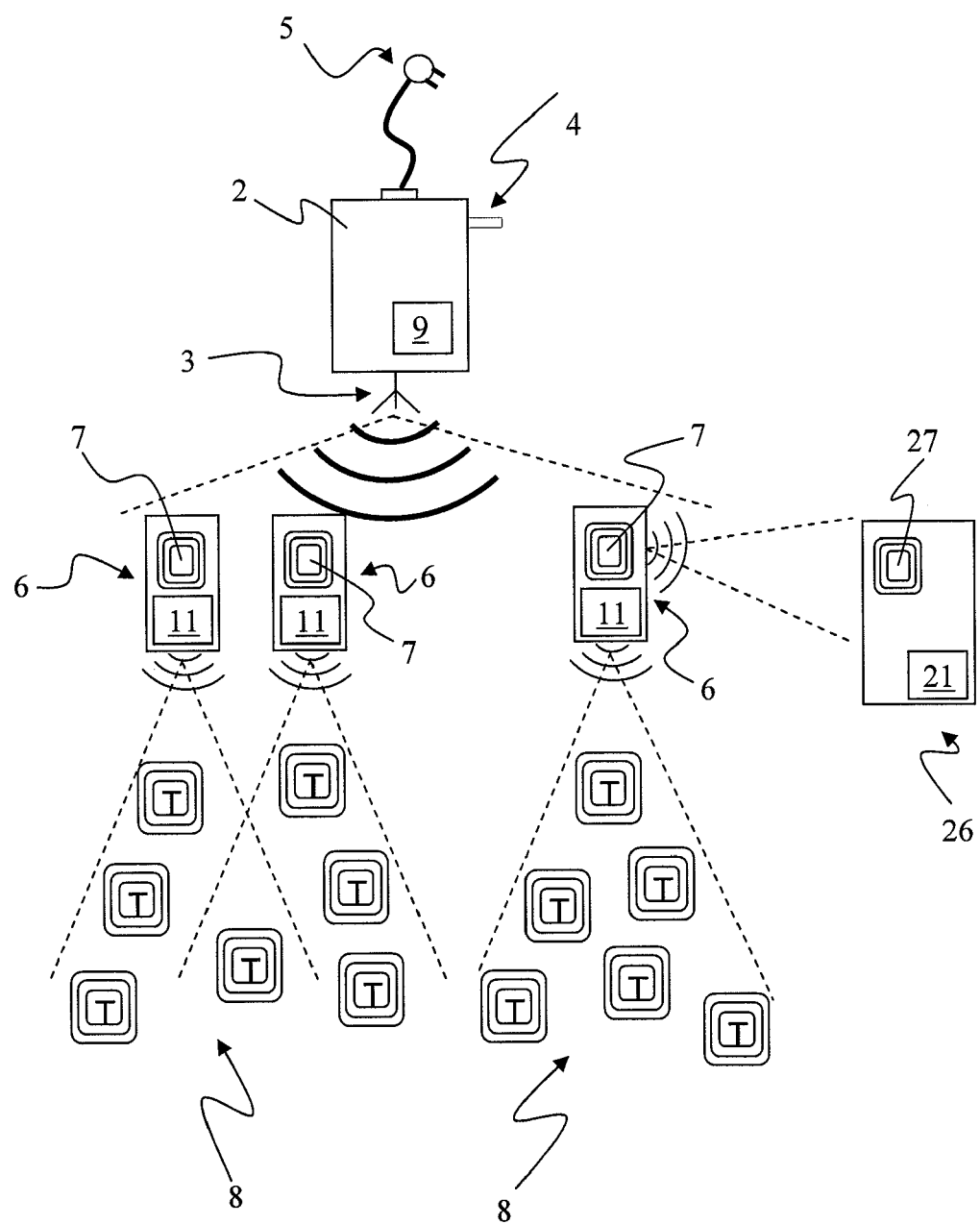
FIG. 3 is another schematic illustration of components of a system of the invention including a mobile reader device.

FIG. 3 is another schematic illustration of an embodiment of the system according to the invention. A master reader 2 is provided, having a network interface 4, for communication with an enterprises' back-end system or like, and a (bidirectional) RFID interface 3 for transmitting tag wake-up sequences and receiving tag responses. The master reader 2 comprises its own power source or power supply interface 5, and is controlled by a controller 9.

Within the range of the master reader 2 slave reader devices 6 are located (in the depicted example three thereof, although the number is not limited). Each slave reader device 6 comprises at least an RFID interface 7 and a controller 11 controlling the slave reader device. The system further comprises a plurality of RFID tags (T) 8. A mobile reader device 26 is also shown, having a radio interface 27 and a controller 21 controlling the mobile reader.

The coverage areas of the master 2 and slave reader 6 devices are indicated by dashed lines. It is required that each slave reader device 6 is arranged within coverage of the master reader's RFID interface 3. It is further required that each RFID tag 8 is located in coverage range of at least one reader (master or slave). A single tag can be within range of more than one reader, as shown here.

It is not strictly necessary that any RFID tag 8 is within range of the master reader 2, as long as it is within range of at least one slave reader 6. In such a distributed architecture the slave readers 6 act as relays, "forwarding" or repeating any wake-up sequence sent from the master reader 2 to tags within their range. The responses of the RFID tags 8 are then received by the slave reader devices 6, in order to derive the tag information, i.e. the data payload of the tags.

The tag information gathered by the slave reader devices 6 is then relayed to the master reader 2, via the RFID interface, upon request from the master reader or by themselves. Slave readers may e.g. be scattered across an enterprise or store, with the number of slave readers being determined by the number and location of tags to be read, and one or more master readers with extended capabilities will be used for information management, using the data conveyed via the slave readers. Slave reader ranges may also overlap in order to allow a failsafe solution for detecting all tags. Overlapping reading ranges for slave readers may also allow data readings with higher accuracy; as an example, ranges may overlap up to 50% on each side or outer edge of a reading space. In other cases, overlapping ranges may not be desired in order to keep system cost down.

The mobile reader 26 can communicate with the slave readers 6, allowing it to enter a listening mode in which the mobile reader 26 can cut power to the radio interface 27 and then operate in a passive listening mode. The mobile reader 26 does not need to perform any wake-up sequences or provide the tags 8 with RF power, as these tasks are accomplished by the slave reader devices 6. In exemplary embodiments the mobile reader 26 can be equipped with an RFID tag (not shown). This tag can enable slave and/or master readers to recognize that a new mobile reader has entered their communication range.

The slave reader devices 6 can be, but do not need to be, "passive" reader devices in the sense that they are activated and powered by the master reader, via radio energy. It is also possible to provide the slave readers with their own power supply, e.g. batteries or a power cord for connection with a wall power socket, and only have them activated by the wake up signal from the master reader. The latter embodiment has the advantage that the effective range of the slave readers can be improved. A slave reader may also have various capabilities; it may be a simple device directed mainly to generating necessary power for waking up tags, or it may e.g. be a full tag reader with integrated memory and a wireless connection to the closest master reader.

However, in case the slave readers are dependent on a wall power socket or like, this is achieved at the cost of loss of flexibility regarding placement of the slave readers. Battery-powered slave readers are more flexible, but do need a certain amount of maintenance, i.e. battery replacement. Also battery-powered slave readers can provide a slightly reduced reliability in case of empty batteries.

Various applications are conceivable for an architecture such as in the exemplary embodiments described above. Mobile readers may be provided as a separate device, e.g. for an employee in a warehouse. When the employee moves around the warehouse, it is possible to look specifically for a certain object (which is identified by its attached or integrated tag). In a conventional case, a large number of tags located in the proximity of the mobile reader would usually provide responses, making a search almost impossible. An employee would have to process each product, object or tag one by one in order to find the desired tag.

In contrast, the inventive exemplary embodiments allow getting information on a single object within several other objects. For example, a mobile reader may indicate that a certain object is not in the correct section of a warehouse, which is particularly useful for objects that need special storage conditions in terms of e.g. temperature. By looking for a certain parameter or information transferred from the tags via the slave or master readers, the section of the warehouse may easily be screened for objects with this parameter stored on their tags. Subsequently, a red or green light as briefly described above may indicate the presence of certain items. Naturally, other types of audible or visible indication are equally conceivable.

In another example case, a user in a department store may be provided with a mobile reader. Since the mobile reader does not need to perform the tag wake-up processes and/or is not responsible for collision management, but rather may simply use the information obtained from slave/master readers, the mobile reader device may be simple in structure and thus inexpensive. This may also allow to integrate such a mobile reader in other devices for daily use, or e.g. to integrate mobile readers in shopping carts. As already described previously, each shelf or a predefined shelf section may each be provided with a more or less simple slave reader device, which is again connected to a master reader.

The information provided by tags, which may be attached to each package or object within the shelves, is received by one or more slave readers within coverage range, and the information may than be conveyed to the master reader for storing and managing. A user may for example be able to enter the items he would like to find into an application on the mobile reader device. Then, the master readers and/or slave readers communicating with the mobile reader upon entering the respective section may be able to provide information on the desired article, and optionally also provide information on the location where the article may be found. There is no need for the mobile reader to check each single tag separately, thus considerably decreasing time and power consumption for a user. At the same time, the hierarchical reader/tag structure allows to manage any tag information in a centralized manner.

Although exemplary embodiments of the present invention have been described, these should not be construed to limit the scope of the appended claims. Those skilled in the art will understand that various modifications may be made to the described embodiments and that numerous other configurations or combinations of any of the embodiments are capable of achieving this same result. Moreover, to those skilled in the various arts, the invention itself will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention.

The invention claimed is:

1. Method, comprising
transmitting a first radio frequency identification tag wake-up sequence by a master reader device;
responsive to receipt of said first wake-up sequence, transmitting a second radio frequency identification tag wake-up sequence by at least one slave reader device;
responsive to receiving said first and/or said second wake-up sequence at one or more radio frequency identification tags of a plurality of radio frequency identification tags, responding to either said first or second wake-up sequence;
receiving responses from said one or more radio frequency identification tags at said master reader;
deriving first tag information from said responses at said master reader; and
said master reader being provided with said first tag information.

2. Method according to claim 1, further comprising
receiving one or more responses from said plurality of radio frequency identification tags at said slave reader;
deriving second tag information from said responses;
storing said second tag information; and
providing said stored second tag information.

3. Method according to claim 2, further comprising
responsive to completion of receiving said responses and storing of said second tag information, communicating an acknowledgement indicating said completion from said at least one slave reader device to said master reader device.

4. Method according to claim 2, wherein said stored second tag information is provided to said master reader device, further comprising
providing said second tag information by said master reader.

5. Method according to claim 2, wherein said stored second tag information is provided to a mobile reader device by said master reader device or said at least one slave reader device.

6. Method according to claim 4, further comprising
requesting second tag information from said at least one slave reader device by said master reader device;
receiving second tag information from said at least one slave reader device; and
providing said second tag information.

7. Method according to claim 4, wherein at least two slave reader devices provide their respective stored second tag information to said master reader device, the method further comprising
determining the position of at least one radio frequency identification tag from said plurality of radio frequency identification tags, based on tag information related to said at least one tag provided by said at least two slave reader devices.

8. Method according to claim 7, wherein at least three slave reader devices provide their respective stored second tag information to said master reader device, wherein the tag information provided by each of said at least three slave reader devices includes a received signal strength indication related to said at least one tag, and wherein the position of said at least one tag is determined based on said strength indication.

9. Computer readable medium storing instructions for instructing a controller to perform the method of claim 1.

10. System, comprising
at least one master reader device having a first coverage area and having
a radio interface;
a network interface;
a controller; and
a power source;
at least two slave reader devices arranged within the first coverage area and each having a second coverage area and each having
a radio interface; and
a controller;
at least a first plurality of radio frequency identification tags arranged within said second coverage area;
wherein
said master reader controller is configured to transmit a first radio frequency identification tag wake-up sequence and to receive responses from said at least first plurality of radio frequency identification tags, to derive tag information from received responses, and to provide said tag information via said network interface; and
said slave reader controller is configured to transmit, responsive to said first radio frequency identification tag wake-up sequence, a second radio frequency identification tag wake-up sequence, using said radio interface, and
wherein said master reader controller is further configured for determining the position of at least one radio frequency identification tag from said at least the first plurality of radio frequency identification tags, based on tag information related to said at least one tag provided by said at least two slave reader devices.

11. System according to claim 10, wherein at least part of said second coverage area is located outside said first coverage area.

12. System according to claim 10, wherein said slave reader controller is further configured to provide said first and said second tag information to a reader device, via said radio interface.

13. System according to claim 10, wherein said at least one slave reader device further comprises
a memory;
wherein said slave reader controller is configured to receive responses from said at least first plurality of radio frequency identification tags through said radio interface, to derive tag information from said responses, to store said tag information in said memory, and to provide said tag information responsive to a request from a reader device.

14. System according to claim 13, wherein said slave reader controller is configured to provide said stored tag information responsive to a request from said at least one master reader device.

15. System according to claim 13, wherein said slave reader controller is configured for communicating, responsive to completion of receiving said responses and storing said tag information, an acknowledgement indicating said completion via said radio interface to said at least one master reader device.

16. System according to claim 10, wherein said slave reader controller is configured for forwarding an instruction for setting said at least first plurality of radio frequency identification tags into a silent mode, using said radio interface.

17. System according to claim 10, comprising at least three slave reader devices, wherein the tag information provided by each of said at least three slave reader devices includes a received signal strength indication related to said at least one tag, and wherein the master reader controller is configured for determining the position of said at least one tag based on said strength indication.

18. System according to claim 10, further comprising a mobile reader device located within the coverage range of at least one of said slave and master reader devices, wherein said mobile reader device is configured to communicate with said at least one of said slave and master reader devices.

19. System according to claim 18, wherein said mobile reader device is configured to enter a listening mode upon detecting a radio frequency field from said slave or master reader devices.

20. System according to claim 18, wherein said slave reader devices are configured to transmit or relay tag information to said mobile reader device.

21. System according to claim 20, wherein said mobile reader devices are configured to request tag information from said slave or master reader devices, and are further configured to receive said requested tag information in response.

22. Master reader device having a first coverage area and having
a radio interface;
a network interface;
a controller; and
a power source;
wherein said master reader is configured to be used in a system having at least two slave reader devices and
at least a first plurality of radio frequency identification tags,
wherein said at least two slave reader devices are arranged within the first coverage area and having a second coverage area and having
a radio interface; and
a controller;
and wherein said at least one first plurality of radio frequency identification tags are arranged within said second coverage area;
wherein
said master reader controller is configured to transmit a first radio frequency identification tag wake-up sequence and to receive responses from said at least first plurality of radio frequency identification tags, to derive tag information from received responses, and to provide said tag information via said network interface; and
wherein in said system said slave reader controller is configured to transmit, responsive to said first radio frequency identification tag wake-up sequence, a second radio frequency identification tag wake-up sequence, using said radio interface, and
wherein said master reader controller is further configured for determining the position of at least one radio frequency identification tag from said at least first plurality of radio frequency identification tags, based on tag information related to said at least one tag provided by said at least two slave reader devices.

* * * * *